Patented Dec. 2, 1924.

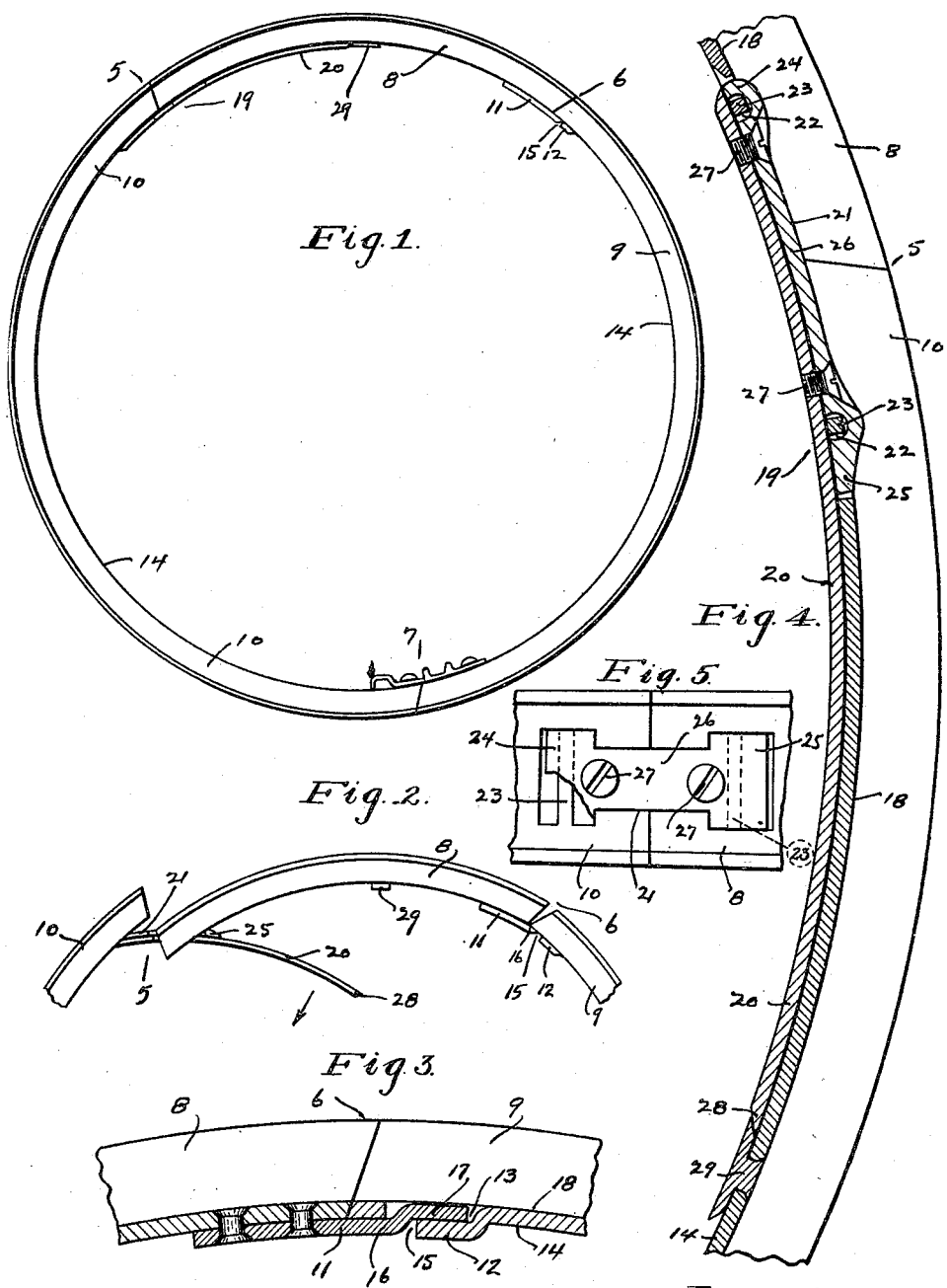

1,517,558

UNITED STATES PATENT OFFICE.

JOHN E. HALL AND FRANK J. MINKLE, OF BUFFALO, AND LEVI A. CASS, OF WARSAW, NEW YORK, ASSIGNORS TO NEW YORK STATE SIMPLEX RIM CORPORATION, A CORPORATION OF NEW YORK.

COLLAPSIBLE TIRE RIM.

Application filed August 15, 1923. Serial No. 657,468.

*To all whom it may concern:*

Be it known that we, JOHN E. HALL and FRANK J. MINKLE, of the city of Buffalo, county of Erie, and State of New York, and LEVI A. CASS, of the village of Warsaw, county of Wyoming, and State of New York, all citizens of the United States of America, have invented certain new and useful Improvements in Collapsible Tire Rims, of which the following is a full, clear, and exact description.

Our invention relates in general to tire rims, and more particularly to a split and collapsible rim.

The principal object of our invention has been to provide a split tire rim, which may be collapsed, without the use of tools, to such a degree that the tire may be easily removed therefrom or applied thereto.

Another object has been to provide a device which shall be comparatively inexpensive to manufacture and one which shall be sturdy in construction and durable in operation.

The above objects and advantages have been accomplished by the device shown in the accompanying drawings, of which:

Fig. 1 is a face view of our complete rim.

Fig. 2 is a fragmentary portion of the same, partially collapsed.

Fig. 3 is an enlarged, fragmentary, sectional view of one of the hinge joints of our device.

Fig. 4 is an enlarged, fragmentary, sectional view of the operating means of our device.

Fig. 5 is a plan view, shown on a reduced scale and partly broken away, of our hinge clamping member, and its connected parts, which is used with the operating means shown in Fig. 4.

As shown in Fig. 1, our rim is provided with three joints 5, 6, and 7, thus providing sections 8, 9, and 10. The joint 7 is the well known joint furnished on split rims, and is standard in type. Therefore, this joint will not be described in detail except to state that in the operation of collapsing the rim, this joint acts as a hinge and allows the sections 9 and 10 to slightly approach each other.

The joint 6, shown enlarged in Fig. 3, provides the principal hinge when the device is being operated. The end of the section 8 is provided with a lug 11, which is secured to this section by means of riveting as shown, or other suitable means. The end of the section 9 adjacent the joint 6 is provided with an inwardly extending portion 12, having its outer face 13 substantially in line with the inner face 14 of the rim. A slot 15 is provided near the end of this section in front of the portion 12. The lug 11 is provided with an outwardly extending portion 16 which is provided with a right-angled off-set end 17 for engagement with the end of the section 9 adjacent the joint 6. The end 17 will lie on the outer surface of the portion 12, which causes its outer surface to lie flush or slightly inside the outer rim surface 18. The engagement of the outwardly extending portion 16 and the end 17 with the slot 15 and the portion 12, respectively, of the section 9 locks the parts 8 and 9 together, but permits the same to have hinged engagement.

The operating means 19 of our device comprises a lever 20, which lies in contact with the inner surface 14 of the rim, and a hinge clamping member 21, which is secured to one end of the lever 20. The hinge clamping member 21 is provided at each end with a recess 22, which engages with a pin 23 formed on each of the sections 8 and 10 of the rim, and thereby forms a double hinge construction. The pins 23 are formed by cutting out the rim section on each side of the pins, as shown in Fig. 5. By cutting out the sections of the rim not only are the pins 23 formed, but space is provided for the lugs 24 and 25, as well as the body 26 of the clamping member, whereby the body will be made to lie substantially flush with the outer surface 18 of the rim sections. The clamping member 21 is secured to the operating lever 20, preferably by means of screws, or rivets 27. By this structure, the operating device is pivotally attached to the ends of the rim sections 8 and 10 adjacent the joint 5. The extreme outer end of the operating lever 20 is provided with a chamfered edge for engagement with a turn button 29, whereby the lever may be securely locked in its closed position.

When it is desired to collapse our rim, the turn button 29 is rotated so as to release the outer end of the operating lever 20. The operating lever is then moved in the direction indicated by the arrow in Fig. 2 until its end is brought to bear against the inner surface of the section 10, whereupon the rim will be fully collapsed. During the collapsing operation, the joints 6 and 7 will operate to provide hinges between the sections, as hereinbefore described. When a tire is placed upon the rim, it is only necessary to reverse the operation above described. It will be seen that, when the lever 20 is moved toward the rim section 8, that a strong leverage will be had, whereby the rim sections may be forced together and into their normal, expanded positions.

Obviously, some modifications of the details herein shown and described may be made without departing from the spirit of our invention, or the scope of the appended claims; and we do not, therefore, wish to be limited to the exact embodiment herein shown and described, the form shown being merely a preferred form of our invention.

Having thus described our invention, what we claim is:

1. A tire rim comprising a plurality of sections, two of the sections being joined by operating means comprising an operating lever, a hinge clamping member secured to the lever, the hinge clamping member being pivotally connected to each of the rim sections by engagement with an integral pin carried by each of the sections and formed therefrom, thereby providing a hinge action between the sections.

2. A tire rim comprising a plurality of sections, each of two of the sections being formed near its abutting end with slots forming a recess and an integral pin, an operating lever arranged adjacent the joint between the sections, and a hinge clamping member disposed in the slots and engageable with the pins.

In testimony whereof, we have hereunto signed our names.

JOHN E. HALL.
FRANK J. MINKLE.
LEVI A. CASS.